United States Patent Office
2,985,527
Patented May 23, 1961

2,985,527
NITRIC ACID PROCESS FOR THE PRODUCTION OF SOLUBLE PHOSPHATES
Ernest S. Nossen, 3—06 34th St., Fairlawn, N.J.
No Drawing. Filed Aug. 10, 1956, Ser. No. 603,230
6 Claims. (Cl. 71—39)

This invention relates to phosphates and more particularly to a process for producing soluble phosphates from phosphate rock.

The term "soluble phosphates" as used in this specification and the appended claims is deemed to mean phosphates which are soluble under the conditions prevailing in the stomach and the soil.

Phosphorus is essential to the life of plants and animals and it is one of the most important constituents in their food. One of the chief sources for the production of phosphorus and its derivatives and compounds is phosphate rock containing large amounts of tricalcium-phosphate. However, in utilizing phosphate rock as raw material for phosphate containing animal foods and fertilizers it must be borne in mind that the natural rock is almost completely insoluble in water and the organic acids present in the stomach and soil. For the purpose of utilizing the phosphorus contained in rock as food for plants and animals, this phosphorus has thus first to be converted into a form in which it can be gainfully taken up by the organism of plants and animals.

For this reason, the tricalcium phosphate contained in phosphate rock is commonly treated so as to be converted into the more soluble mono- or dicalcium phosphate.

For the purpose of converting the phosphorus contained in phosphate rock into compounds useful as fertilizers, it is known to treat the rock with sulfuric acid, whereby a mixture of mono- or dicalcium phosphate with calcium sulfate is obtained. The calcium sulfate has no fertilizing value in the mixture and its formation consumes large amounts of sulfuric acid.

In the production of fertilizers from phosphate rock, it is also known to replace the sulfuric acid by nitric acid completely or partly and to convert the calcium nitrate formed in this reaction as by-product. This conversion is effected by, for example, adding ammonia to the reaction mixture, whereby lime and ammonium nitrate are formed, or by adding potassium sulfate, whereby potassium nitrate and calcium sulfate are formed. By this process a mixture of a phosphate-containing compound with salts is thus obtained. It is not feasible to separate the phosphate-containing compound from the mixture which latter may be used as fertilizer. The nitric acid can thus not be recovered. From above it will be clear that all known products obtained by the interaction of phosphate rock and sulfuric or nitric acid contain—besides the phosphorus compound or compounds and impurities emanating from the rock—a high amount of salts with salts are not readily separable. These products thus comprise a relatively low percentage of phosphorus.

Products comprising a high amount of phosphorus are produced from phosphate rock by reacting the latter with phosphoric acid. In case relatively pure products having a high phosphorus content are to be produced, the raw material is not phosphate rock proper—since the latter contains relatively large amounts of impurities—but phosphoric acid which is reacted with alkali or alkaline earth compounds. Dicalcium phosphate, for example, is commonly produced in this manner by partial neutralization of phosphoric acid with lime. The phosphoric acid in turn is usually produced from elemental phosphorus obtained from phosphate rock in an electro-thermic reduction, or by a wet process in which phosphate rock is treated with sulfuric acid.

The electro-thermic reducing reaction referred to requires expensive equipment and costly energy. The wet process on the other hand requires relatively large amounts of sulfuric acid which cannot be recovered.

It is an object of this invention to provide a process for the production of products from phosphate rock which products contain a very high percentage of phosphorus and may successfully be used for fertilizing and/or animal-feeding purposes.

Another object of the invention is the provision of a process for the production of phosphorus-comprising products from phosphate rock which products are substantially devoid of impurities emanating from the rock.

Still another object of the invention is the provision of a process for the production of phosphorus-comprising products from phosphate rock which process is simple and inexpensive to carry out, requires no excessive amount of energy and which does not require complicated apparatus.

It is also an object of the invention generally to improve on processes for the production of phosphorus containing fertilizers and animal foods from phosphate rock as now customarily practised.

Still another object of the invention is the provision of an improved process for the production of feed-grade dicalcium phosphate from phosphate rock.

Considered from another aspect, the invention has as its object to provide a leaching process for the production of phosphorus-containing high-grade fertilizers and/or animal food from phosphate rock, wherein the leaching agent may be recovered to a considerable extent and recycled for leaching further quantities of phosphate rock.

In accordance with the present invention phosphate rock, in comminuted form, is leached with nitric acid. In this manner a leach slurry comprising phosphoric acid and calcium nitrate in solution and a solid gangue material containing $TiO_2$, $Al_2O_3$, $SiO_2$ and $CaF_2$ is formed. The pH value of the leach slurry being close to 0 is raised to about 4 by adding an alkaline substance, preferably CaO or $CaCO_3$, whereby dicalcium phosphate is precipitated on the surface of the gangue material. The precipitate and the gangue material are filtered from the solution now primarily comprising calcium nitrate. This calcium nitrate is concentrated and decomposed yielding calcium oxide (lime) and nitric acid as decomposition products. Both the nitric acid and the lime may be recycled, i.e. the nitric acid may be employed for leaching further quantities of rock while the lime may be used for raising the pH value and thereby causing the precipitation of dicalcium phosphate. The dicalcium phosphate containing product thus obtained is an excellent fertilizer.

While high grade rock contains approximately 40% of $P_2O_5$, large deposits of rock of lower grade containing but 30% of $P_2O_5$ or less are often available. These lower grade rocks comprise a higher percentage of limestone ($CaCO_3$) and thus cannot be worked up economically with sulfuric acid since the sulfuric acid consumption would be excessive due to the presence of the large amounts of limestone. Moreover, the resulting product would have a low phosphorus content. However, by the nitric acid leaching cycle described above, such lower grade rocks may be successfully and economically worked up to obtain a product having a high phosphorus content. The increase in the production costs due to the decomposition of the calcium nitrate is only slight on account of the fact that the decomposition products, i.e. nitric acid and lime, may be recycled.

The main reactions involved in the process of this invention are the following:

(1) $Ca_3(PO_4)_2 + 6HNO_3 \rightarrow 2H_3PO_4 + 3Ca(NO_3)_2$
(2) $2H_3PO_4 + 3Ca(NO_3)_2 + CaO \rightarrow$
$CaH_4(PO_4)_2 + 3Ca(NO_3)_2 + H_2O$
(3) $CaH_4(PO_4)_2 + 3Ca(NO_3)_2 + H_2O + CaO \rightarrow$
$2CaHPO_4 \cdot 2H_2O + 3Ca(NO_3)_2$
(4) $3Ca(NO_3)_2 + 3H_2O \rightarrow 3CaO + 6HNO_3$ Since phosphate rock contains $CaF_2$ in the form of a complex compound associated with the tricalcium-phosphate, some HF is liberated in Reaction 1. This HF is partly boiled off and partly reacts with silica of the rock. A slight amount of HF remains in the solution and is co-precipitated by the line.

The process described above yields a crude product comprising dicalcium phosphate—in case a calcium compound is employed as precipitating agent—and the gangue emanating from the rock. In case it is desired to obtain a pure product, i.e. pure dicalcium phosphate without gangue, then the reaction mixture is filtered after step (2). The filtration effects then the removal of the gangue. Further, the small amounts of calcium fluoride formed by the HF referred to are removed in this manner. The substantially pure dicalcium phosphate obtained in this manner is particularly suitable as feed supplement for animal food, since such feed supplement should be substantially devoid of impurities as constituted by the gangue and the calcium fluoride.

It is pointed out at this stage that the course of the reaction is dependent on the pH value of the solution. At a pH value of about 0, i.e. after the leaching, free phosphoric acid is present. When the pH is raised to a value of about 1.5–2 by addition of lime or the like, water-soluble monocalcium phosphate is formed, while the precipitation of dicalcium phosphate starts above the last mentioned pH value and is substantially completed at a pH value of about 4.

The solution after step (2) thus contains monocalcium phosphate and calcium nitrate. By adding calcium oxide, dicalcium phosphate is precipitated which precipitation—depending on the concentration of the solution—is completed at a pH value of approximately 4.

According to a further embodiment of the process of this invention, it is feasible to leach the phosphate rock with less nitric acid, whereby water-soluble monocalcium phosphate is formed in the first place. This monocalcium phosphate is then precipitated in the manner described above. This last mentioned reaction proceeds according to the following formula:

(1) $Ca_3(PO_4)_2 + 4HNO_3 \rightarrow CaH_4(PO_4)_2 + 2Ca(NO_3)_2$
(2) $CaH_4(PO_4)_2 + CaO + H_2O + 2Ca(NO_3)_2 \rightarrow$
$2CaHPO_4 \cdot 2H_2O + 2Ca(NO_3)_2$
(3) $2Ca(NO_3)_2 + 2H_2O \rightarrow 2CaO + 4HNO_3$ However, this last mentioned process employing less nitric acid yielded only 70–75% of citric acid-soluble phosphate calculated on the phosphate rock as compared to 85% when the inventive process is carried out in accordance with the first described embodiment. In both cases the dicalcium phosphate precipitate is separated from the calcium nitrate solution. The solid product is washed and dried, while the calcium nitrate solution is concentrated and decomposed to recover lime and nitric acid.

With a view to recovering the nitric acid and the lime, the calcium nitrate solution is preferably subjected to a thermal decomposition treatment. Calcium nitrate is decomposed at a temperature higher than its decomposition point, for example between 550–650° C. If seam is present in sufficient quantities to react with the nitric oxides evolved by the decomposing calcium nitrate to form nitric acid and to protect the nitric acid thus formed against splitting, then a substantial portion of nitric acid is formed directly from the steam and the nitric oxides evolved by the decomposing calcium nitrate. This nitric acid is recovered in liquid form by condensing the nitric acid vapors. The remaining nitric oxides which do not directly react with the steam, leave the condensor and are thereafter converted into nitric acid in an oxidation and absorption tower. By decomposing a concentrated calcium nitrate solution continuously and conducting the steam formed by the decomposing solution concurrently with the evolving nitric oxides, favorable conditions for direct formation of nitric acid are created both from a technical and an economic point of view.

Before the decomposition of the calcium nitrate takes place, the salt goes through a viscous state wherein it decreases its surface and forms an impermeable cake mass inclined to stick to the walls of the decomposition unit. It has been found that this disadvantageous phenomenon can be avoided by employing a carrier material for the salt or solution to be decomposed. In practice, the calcium nitrate solution is thus sprayed onto the carrier material. Calcium oxide, the solid decomposition product of the decomposition, may be recycled and used as such carrier material. The quantity relation of recycled calcium oxide to calcium nitrate may be varied from between 5:1 to 2:1. Other carrier material such as sand, leach residue of the rock and the like may be used as well. However, the use of calcium oxide as carrier material is particularly advantageous since it provides for a recovery of the lime used in the process.

Although it has been pointed out that calcium oxide and calcium carbonate are particularly suitable as precipitating agents for precipitating the phosphate from the leach solution of the rock and calcium oxide has been indicated as such agent in the general formulas given, it is emphasized that other alkaline substances such as alkaline sodium, magnesium or potassium compounds may be used as well for the purpose of raising the pH-value of the leach solution.

The invention will now be described with reference to several examples, it being understood that these examples are given by way of illustration rather than by way of limitation, and that many variations and changes in, for example, quantity proportions, choice of materials and process conditions in general may be made without departing in any way from the spirit and scope of the invention as recited in the appended claims.

Example 1

100 grams of phosphate rock were comminuted to −60 +100 mesh and suspended in 100 cubic centimeters of water. 90 cubic centimeters of nitric acid of 70% concentration were added to the suspension. The slurry thus obtained was stirred for about 20 minutes. The slurry—hot from the exothermic reaction heat—was then filtered and the filtered off solid mass was washed. An aqueous lime-suspension was thereafter added to the clear filtrate until the pH of the filtrate had risen from about 0-value to 4. The addition of the lime suspension caused the precipitation of dicalcium phosphate. The precipitation was completed at the pH value of 4. The dicalcium phosphate which was thereafter separated from the remaining filtrate, may be used as fertilizer or animal food. It is readily soluble in soil and gastric juices, i.e. under the conditions prevailing in the stomach. The yield of dicalcium phosphate was 85% calculated on the phosphorous content of the phosphate rock employed.

The remaining filtrate solution was concentrated to a specific gravity of 1.7. It was thereafter sprayed onto calcium oxide obtained in the decomposition of a preceding batch. This calcium oxide thus served as carrier for the solution. The filtrate thus sprayed onto the carrier was thereafter decomposed at a temperature of about 600° C. in the presence of steam into a gaseous product containing nitric acid vapors and nitric oxides and a solid product consisting of calcium oxide. By chilling the vapors referred to, a substantial part of the nitric acid was directly recovered in liquid form. The remainder was recovered in an absorption tower in contact with water. The total recovery of nitric acid was 94%. The nitric acid was recycled for leaching a further quantity of rock, while the calcium oxide was reused either as precipitating agent for the leach solution or as carrier for the calcium nitrate solution to be decomposed.

*Example 2*

100 grams of phosphate rock containing about 14% of phosphorus were ground to −30 +60 mesh and suspended in 75 cubic centimeters of water. 135 cubic centimeters of nitric acid of 50% strength, which acid was recycled from the calcium nitrate decomposition of a preceding batch, were added to the suspension. The slurry thus obtained was stirred for about 20 minutes at a temperature of about 90° C. The pH of the slurry was thereafter raised to about 1.5–2.0 by adding limestone. The addition of the limestone up to this pH value causes the precipitation of the flour contained in the slurry in solution and moreover improves the filterability of the slurry. The phosphate contained in the slurry is at this pH value present in the form of the water-soluble calcium monophosphate so that no precipitation of phosphate occurs. The slurry was then filtered, whereby the gangue and the fluoride were separated from the solution. A lime suspension was then added to the clear filtrate solution until the pH value rose to 4. The addition of the lime suspension caused the precipitation of the monophosphate as dicalcium phosphate. The dicalcium phosphate was filtered from the solution. It may be used as fertilizer and—since it is devoid of flour—it is particularly suitable as animal food. The remaining calcium nitrate solution was decomposed as described in connection with Example 1.

*Example 3*

100 grams of phosphate rock were comminuted to −60 +100 mesh and suspended in 100 cubic centimeters of water. 90 cubic centimeters of nitric acid of 70% strength were added to the suspension. The slurry thus obtained was stirred for about 20 minutes. A lime suspension was then added to the slurry until the pH value of the slurry was about 4. The addition of the lime suspension caused the precipitation of the phosphorus in the slurry as dicalcium phosphate on the surface of the gangue material. The dicalcium phosphate together with the undissolved gangue of the rock was separated from the slurry by filtration. The dicalcium phosphate containing mass thus obtained constitutes an excellent fertilizer. The calcium nitrate solution remaining after the filtration was decomposed as described in Example 1.

I claim:

1. A process for the production of dicalcium phosphate from phosphate rock wherein the acid used in leaching the rock and the calcium oxide extracted from it are recovered, which comprises leaching phosphate rock with an aqueous nitric acid solution whereby a slurry is formed comprising a solid gangue portion and a liquid portion containing phosphorus compound and calcium nitrate, adding to said slurry a first portion of inorganic alkaline compound selected from the group consisting of lime and limestone in sufficient quantity to adjust the pH of said slurry to a value of about 1.5, separating the solids from the liquid in said slurry, adding a second portion of said inorganic alkaline compound to the liquid separated in sufficient quantity to adjust the pH above 4 so that the phosphorus compound therein is precipitated from said separated liquid as dicalcium phosphate and calcium nitrate is retained in said separated liquid, recovering said dicalcium phosphate, thermally decomposing the calcium nitrate contained in said separated liquid to recover the nitric acid and calcium oxide and recycling said recovered nitric acid to said acid leaching step.

2. A process according to claim 1 wherein calcium oxide recovered from said thermal decomposition step is utilized as said inorganic alkaline compound in the appropriate steps of said process.

3. A process for the production of dicalcium phosphate from phosphate rock wherein the acid used in leaching the rock and the calcium oxide extracted from it are recovered, which comprises leaching phosphate rock with an aqueous nitric acid solution whereby a slurry is formed comprising a solid gangue portion and a liquid portion containing phosphorus compound and a calcium nitrate compound, adding to said liquid portion an inorganic alkaline compound selected from the group consisting of lime and limestone in sufficient quantity to adjust the pH so that the phosphorus compound therein is precipitated substantially as dicalcium phosphate and the calcium nitrate is retained in said liquid, recovering said dicalcium phosphate, disposing said calcium nitrate compound on the surface of a granulated inorganic carrier material, thermally decomposing said calcium nitrate disposed on said carrier to calcium oxide and nitric acid by heating it above the decomposition point of said calcium nitrate until decomposition is substantially completed, recycling the nitric acid formed in said thermal decomposition step to said acid leaching step.

4. A process according to claim 3 wherein said granulated inorganic carrier material is selected from the group consisting of calcium oxide, sand and leach residue from phosphate rock.

5. A process according to claim 4 wherein calcium oxide recovered from said thermal decomposition of said calcium nitrate compound is utilized as said granulated inorganic carrier material.

6. A process according to claim 3 wherein calcium oxide produced from said thermal decomposition step is utilized as said inorganic alkaline compound in the appropriate step of said process.

References Cited in the file of this patent

UNITED STATES PATENTS

| Number | Name | Date |
|---|---|---|
| 982,466 | Blackmore | Jan. 24, 1911 |
| 1,011,909 | Bretteville | Dec. 19, 1911 |
| 1,023,133 | DeJahn | Apr. 16, 1912 |
| 1,292,293 | Foss | Jan. 21, 1919 |
| 2,013,970 | Moore | Sept. 10, 1935 |
| 2,114,600 | Larsson | Apr. 19, 1938 |
| 2,312,047 | Ogburn | Feb. 23, 1943 |
| 2,683,075 | Caldwell | July 6, 1954 |
| 2,728,635 | Miller | Dec. 27, 1955 |
| 2,753,252 | Barnes | July 3, 1956 |
| 2,757,072 | Kapp et al. | July 31, 1956 |
| 2,759,795 | Archer | Aug. 21, 1956 |
| 2,767,045 | McCullough | Oct. 16, 1956 |
| 2,857,245 | Fallin | Oct. 21, 1958 |